United States Patent [19]

Nagai et al.

[11] Patent Number: 4,752,407
[45] Date of Patent: Jun. 21, 1988

[54] PROCESS FOR PRODUCING PLATE-LIKE BARIUM FERRITE PARTICLES

[75] Inventors: Norimichi Nagai; Katsunori Fujimoto, both of Hiroshima; Yasutaka Ota, Saeki; Masao Kiyama; Toshio Takada, both of Kyoto, all of Japan

[73] Assignee: Toda Kogyo Corporation, Hiroshima, Japan

[21] Appl. No.: 7,760

[22] Filed: Jan. 28, 1987

[30] Foreign Application Priority Data

Jan. 29, 1986 [JP] Japan .................................. 61-18833

[51] Int. Cl.$^4$ .............................................. C04B 35/26
[52] U.S. Cl. ................................ 252/62.59; 252/62.63
[58] Field of Search ........................... 252/62.59, 62.63

[56] References Cited

U.S. PATENT DOCUMENTS

| | | | |
|---|---|---|---|
| 4,493,874 | 1/1985 | Kubo et al. | 252/62.59 |
| 4,529,524 | 7/1985 | Nagai et al. | 252/62.59 |
| 4,539,129 | 9/1985 | Nagai et al. | 252/62.63 |
| 4,548,801 | 10/1985 | Nagai et al. | 423/594 |
| 4,561,988 | 12/1985 | Nagai et al. | 252/62.59 |
| 4,584,242 | 4/1986 | Nagai et al. | 428/403 |
| 4,585,568 | 4/1986 | Nagai et al. | 252/62.59 |

FOREIGN PATENT DOCUMENTS 0141558 5/1985 European Pat. Off. .

Primary Examiner—Jack Cooper
Attorney, Agent, or Firm—Cushman, Darby & Cushman

[57] ABSTRACT

Disclosed herein are plate-like barium particles which are suitable for use in precursor of sintered magnets and magnetic recording media, which have an average particle diameter of not less than 0.03 μm and less than 0.1 μm, and which are represented by the following formula (I):

$$BaO \cdot n[Fe_{1-x-y}Co_xTi_y]_2O_{3-x+y}] \qquad (i)$$

wherein x and y are independently from 0.02 to 0.12 and n is from 4 to 7, the atomic ratio of Co to Fe(III) being from 0.02:1 to 0.13:1 and the molar ratio of Ti to Co being from more than 0 to not more than 0.8, and a process for producing the plate-like barium ferrite particles.

1 Claim, 2 Drawing Sheets (×100,000)

(×100,000)

PROCESS FOR PRODUCING PLATE-LIKE BARIUM FERRITE PARTICLES

BACKGROUND OF THE INVENTION

The present invention relates to plate-like barium ferrite particles which are suitable as a precursor of a magnetic material for sintered magnets and magnetic recording media and a process for producing the same. The present invention relates, more particularly, to plate-like barium ferrite particles suitable for use in precursor for sintered magnets and magnetic recording media, which have an average particle diameter of not less than 0.03 μm and less than 0.1 μm, which are represented by the following formula (I):

$$BaO \cdot n[(Fe_{1-x-y}Co_xTi_y)_2O_{3-x+y}] \quad (I)$$

wherein x and y are independently from 0.02 to 0.12 and n is from 4 to 7, the atomic ratio of Co to Fe(III) being from 0.02:1 to 0.13:1 and the molar ratio of Ti to Co being from more than 0 to not more than 0.8, and a process for producing plate-like barium ferrite particles suitable for use in precursor for sintered magnets and sintered magnets and magnetic recording media, which are represented by the following formula (I):

$$BaO \cdot n[(Fe_{1-x-y}Co_xTi_y)_2O_{3-x+y}] \quad (I)$$

wherein x and y are independently from 0.02 to 0.12 and n is from 4 to 7, the atomic ratio of Co to Fe(III) being from 0.02:1 to 0.13:1 and the molar ratio of Ti to Co being from more than 0 to not more than 0.8, which the process comprises autoclaving at a temperature of from 120° to 330° C. an aqueous alkaline suspension of iron hydride(III) containing Fe(III), Co(II), Ti(IV) and Ba ions, the atomic ratio of the amount of Co to the amount of Fe(III) in the suspension being from 0.02:1 to 0.13:1 and the molar ratio of Ti to Co therein being from more than 0 to not more than 0.8, thereby regulating the average particle diameter to from not less than 0.03 μm to less than 0.1 μm.

An object of the present invention is to produce plate-like barium ferrite particles as a precursor, having a desired average particle diameter in the range of not less than 0.03 to not more than 0.1 μm from an aqueous solution, by autoclaving an aqueous alkaline suspension of iron hydroxide (III) containing Ba ions, a predetermined amount of Co compound and Ti compound.

Plate-like barium ferrite particles according to the present invention are mainly used as a precursor of magnetic materials for sintered magnets, magnetic materials for magnetic recording media, etc.

Barium ferrite particles are at present widely used as a precursor of magnetic materials for sintered magnets.

A sintered magnet is manufactured by pressurizing, molding and baking a magnetic material such as barium ferrite particles.

Also, recently it is required to enhance increasingly recording density in the field of magnetic recording. Much has been expected from plate-like barium ferrite particles as a precursor of magnetic materials for magnetic recording media and some of them have been put to practical use.

In a field of magnetic tapes and magnetic discs, rapid progress has been made in putting perpendicular magnetic type tapes and discs which are capable of recording with more than about three times as high density as conventional ones to practical use. Plate-like barium ferrite magnetic particles, which have an easy magnetization axis perpendicular to the plate surface, have been expected as a magnetic material for magnetic recording media.

In a field of magnetic cards, plate-like barium ferrite magnetic particles, which have a higher coercive force than acicular magnetic iron oxide particles and Co-deposited or Co-coated acicular magnetic iron oxide particles which have conventionally been used, are widely used as a magnetic material for magnetic recording media.

Since plate-like barium ferrite magnetic particles have been expected to be used in various fields, as described above, the property of the plate-like barium ferrite particles as a precursor thereof which is commonly required in each field is fineness.

As the plate-like barium ferrite magnetic particles are finer, their surface activity thereof becomes larger and they are easier to sinter. Therefore, it is possible to lower the sintering temperature, which is not only advantageous industrially and economically but also produces a product having a uniform composition.

In a field of magnetic recording media such as magnetic tapes, magnetic discs and magnetic cards, it is necessary to make the particle size of a magnetic material for magnetic recording media very small in order to reduce noise of a recording medium and, in particular, plate-like barium ferrite magnetic particles having a particle diameter of about not greater than 0.1 μm have been strongly demanded.

Some barium ferrite magnetic particles and processes for producing barium ferrite magnetic particles have conventionally been proposed.

Some of the typical ones are plate-like barium ferrite magnetic particles which are represented by the formula $BaCo_xTi_yFe_{12-x-y}O_{19}$ wherein x and y independently are numbers from 0.1 to 0.5 and which have a BET specific surface area of from 20 to 70 m²/g, an average particle diameter of from 0.05 to 0.3 μm, a magnetization of larger than 30 emu/g in a magnetic field of $7.96 \times 10^5$ A m$^{-1}$ (10 KOe) and a coercive force of from $2.39 \times 10^4$ to $7.96 \times 10^4$ A m$^{-1}$ (300 to 1,000 Oe), and a process for producing plate-like barium magnetic ferrite particles represented by the formula:

$$BaCo_xTi_yFe_{12-x-y}O_{19}$$

wherein x and y independently are numbers from 0.1 to 0.5, which process comprises autoclaving at a temperature of from 250° to 320° C. an aqueous alkaline suspension containing Fe(III), Co(II), Ti(IV) and Ba ions and a molar excess with respect to the total amount of Fe(III), Co(II), Ti(IV) and Ba ions of an alkali metal hydroxide and in which suspension the atomic ratio of the total amount of Co(II) and Ti(IV) to the amount of Fe(III) is from 0.017:1 to 0.09:1 and the atomic ratio of Ba ions to the total sum of Fe(III), Co(II) and Ti(IV) is from 1:7 to 1:9 (European Pat. No. 0123445 A).

Another is a process for production of plate-like barium ferrite magnetic particles represented by the formula:

$$BaFe_{12-x-y}M_xTi_yO_{19}$$

wherein x and y are respectively 0.3 to 1.2 and M is a divalent metal selected from the group consisting of Co, Ni, Zn and Mn for magnetic recording, free of $\alpha\text{-}Fe_2O_3$ exhibiting a magnetization of larger than 35 emu/g in a magnetic field of 10 KOe and a coercive force of 500 to 1,000 Oe, which comprises forming an aqueous highly alkaline suspension of particles represented by the formula:

$$Fe_{12-x-y}M_xTi_yO_{16}$$

wherein x, y and M are the same as defined above, having a spinel crystalline structure and an average particle diameter of less than 0.1 μm and Ba ions where the atomic ratio of Ba to the total amount of the metal in said particles of spinel crystalline structure is in the range of from 1:8 to 1:10 and autoclaving said suspension at a temperature in the range from 250° C.–330° C. to form said plate-like barium ferrite particles (U.S. Pat. No. 4,561,988).

These processes, however, are aimed at reducing a coercive force by adjusting the valence of Fe(III) ions and additives, for example, Co(II), Ti(IV), etc., as is clear from the embodiments, and therefore it is preferable that the amounts of Co(II) compound and Ti(IV) compound to be added are equimolar. On the other hand, in the present invention, the amounts of Co(II) compound and Ti(IV) compound to be added are different and they are added in order to control the particle size of the produced plate-like barium ferrite particles. Accordingly, the conventional product and processes are completely different from the process of the present invention in technical means, objects and effects.

Furthermore, in the above-described autoclaving processes, the particle diameter of the produced plate-like barium ferrite particles in usually about 0.05 to 0.3 μm, and it is difficult to obtain fine particles having an average particle diameter of less than 0.1 μm. It is still more difficult to obtain plate-like barium ferrite particles having a desired average particle diameter of less than 0.1 μm in accordance with a particular purpose.

Accordingly, an offer of plate-like barium ferrite particles as a precursor thereof, having an average particle diameter of not less than 0.03 and less than 0.1 μm and a process for producing the plate-like barium ferrite particles have been strongly demanded.

As a result of various studies on a process for producing plate-like barium ferrite particles as a precursor thereof, having a desired particle size of an average particle diameter of less than 0.1 μm, the present inventors have found that plate-like barium ferrite particles as a precursor thereof, having an average particle diameter of not less than 0 03 μm and less than 0.1 μm are produced by autoclaving at a temperature of from 120° to 330° C. an aqueous alkaline suspension containing Fe(III), Co(II), Ti(IV) and Ba ions, the atomic ratio of the amount of Co to the amount of Fe(III) in the suspension being from 0.02:1 to 0.13:1 and the molar ratio of Ti to Co therein being from more than 0 to not more than 0.8, and on the basis of the finding the present invention has been attained.

SUMMARY OF THE INVENTION

In a first aspect of the present invention, there is provided plate-like barium ferrite particles suitable for use in precursor of a magnetic material for sintered magnets and magnetic recording, which have an average particle diameter of not less than 0.03 μm and less than 0.1 μm, which are represented by the following formula (I):

$$BaO.n[(Fe_{1-x-y}Co_xTi_y)_2O_{3-x+y}] \quad (I)$$

wherein x and y are independently from 0.02 to 0.12 and n is from 4 to 7, the atomic ratio of Co to Fe(III) being from 0.02:1 to 0.13:1 and the molar ratio of Ti to Co being from more than 0 to not more than 0.8.

In a second aspect of the present invention, there is provided a process for producing plate-like barium ferrite particles suitable for use in precursor of sintered magnets and magnetic recording, which are represented by the following formula (I):

$$BaO.n[(Fe_{1-x-y}Co_xTi_y)_2O_{3-x+y}] \quad (I)$$

wherein x and y are independently from 0.02 to 0.12 and n is from 4 to 7, the atomic ratio of Co to Fe(III) being from 0.02:1 to 0.13:1 and the molar ratio of Ti to Co being from more than 0 to not more than 0.8, which the process comprises autoclaving at a temperature of from 120° to 330° C. an aqueous alkaline suspension containing Fe(III), Co(II), Ti(IV) and Ba ions and a molar excess with respect to the total amount of Fe(III), Co(II), Ti(IV) and Ba ions of an alkali metal hydroxide, in said suspension the atomic ratio of the amount of Co to the amount of Fe(III) being from 0.02:1 to 0.13:1 and the molar ratio of Ti to Co being from more than 0 to not more than 0.8, thereby regulating the average particle diameter to from not less than 0.03 μm to less than 0.1 μm.

DESCRIPTION OF THE PREFERRED EMBODIMENTS

The heart of the present invention is characterized in that plate-like barium ferrite particles as a precursor, having a desired particle size of an average particle diameter of less than 0.1 μm are produced by adding 2 to 13 atom % of Co compound with respect to Fe(III) and a Ti compound in a molar ratio of $0 < Ti/Co \leqq 0.8$ to an aqueous alkaline suspension of iron hydroxide (III) before the aqueous alkaline suspension of iron hydroxide (III) is autoclaved at a temperature of from 120° to 330° C.

The present invention will be explained in more detail in the following with reference to some of the experiments carried out by the present inventors.

Figure 1:
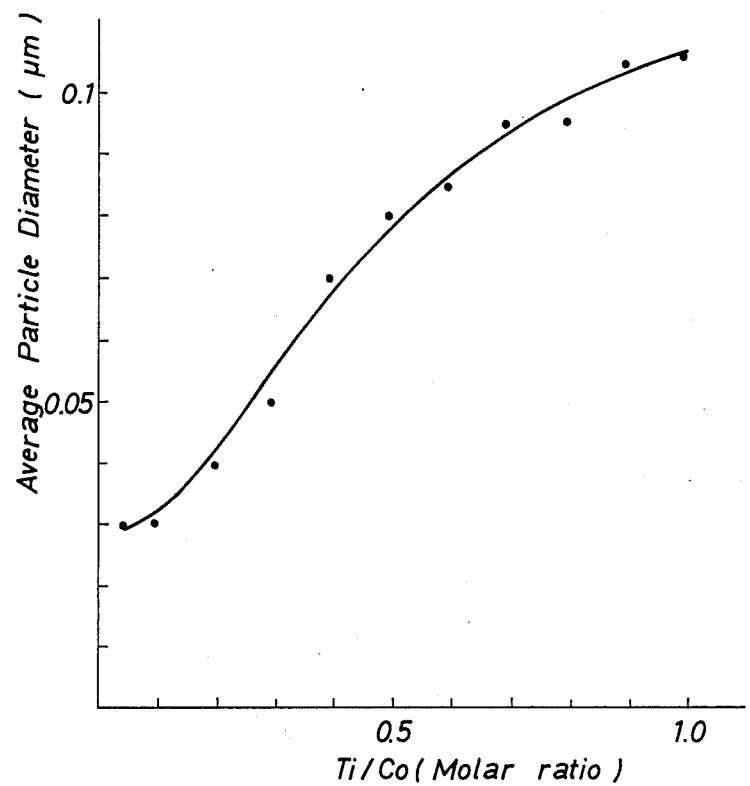
FIG. 1 shows the relationship between the ratio of addition of Ti to Co (in a molar ratio) in the cas of adding 7.86 atom % of Co with respect to Fe(III) and the particle size of the produced plate-like barium ferrite particles.

FIG. 1 shows the relationship between the adding ratio of Ti to Co (in a molar ratio) in the case of adding 7.86 atom % of Co with respect to Fe(III) and the particle size of the produced plate-like barium ferrite particles.

As is seen from FIG. 1, when Ti is added to Co in the adding ratio of not more than 0.8, the particle diameter of the produced plate-like barium ferrite particles is less than 0.1 μm, and the smaller the adding ratio of Ti to Co is, the finer the produced plate-like barium ferrite particles become.

As the Fe(III) salt in the present invention, iron nitride, iron chloride or the like may be used.

As the Ba ions in the present invention, barium hydroxide, barium chloride, barium nitride or the like may be used.

The reaction temperature in autoclaving in the present invention is 120° to 330° C., preferably 150° to 300° C.

If it is below 120° C., it is difficult to produce plate-like barium ferrite particles as a precursor.

Although it is possible to produce plate-like barium ferrite particles as a precursor even if it exceeds 330° C., the upper limit is determined to be 330° C. in consideration of the safety of the apparatus.

As the Co compound, cobalt chloride, cobalt nitride or the like may be used in the present invention.

The amount of the Co compound to be added is 2 to 13 atom % with respect to Fe(III). If it is less than 2 atom %, it is difficult to produce plate-like barium ferrite particles as a precursor, having a particle diameter of less than 0.1 $\mu$m.

Although it is possible to produce plate-like barium ferrite particles as a precursor having a particle diameter of less than 0.1 $\mu$m even if it exceeds 13 atom %, there is no use in adding more Co compound than required.

The Ti compound used in the present invention includes titanium chloride, titanium oxysulfide and alkali titanium.

The amount of Ti compound to be added is in the range of $0 < Ti/Co \leq 0.8$ in a molar ratio.

In the range of $0 < Ti/Co \leq 0.8$, as the amount of Ti to be added becomes smaller, the particle size of the produced plate-like barium ferrite particles becomes smaller and it is therefore possible to control the particle size so as to have a desired value in the range of a particle diameter of not less than 0.03 $\mu$m and less than 0.1 $\mu$m by adjusting the amount of Ti to be added.

The entire amount of Co compound and Ti compound to be added is contained in the plate-like barium ferrite particles, and accordingly the plate-like barium ferrite particles obtained contains 2 to 13 atom % with respect to Fe, and Ti in the range of $0 < Ti/Co \leq 0.8$ in a molar ratio.

The plate-like barium ferrite particles obtained by a process according to the present invention may be baked at a temperature of 600° to 900° C. to form a plate-like barium ferrite magnetic particles and in this case where it is also possible to hold the particle size of the plate-like barium ferrite particles produced from an aqueous solution.

The plate-like barium ferrite particles of the present invention have an average particle diameter of not less than 0.03 and less than 0.1 $\mu$m, and are represented by the following formula (I):

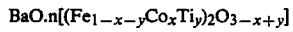

$$BaO.n[(Fe_{1-x-y}Co_xTi_y)_2O_{3-x+y}]$$

wherein x and y are independently from 0.02 to 0.12, n is from 4 to 7, the atomic ratio of Co to Fe(III) being from 0.02:1 to 0.13:1 and the molar ratio of Ti to Co being from more than 0 to not more than 0.8.

Further, the plate-like barium ferrite particles according to the present invention have a BET specific surface area of 65 to 150 m$^2$/g and a magnetization of not less than 5 to 25 emu/g, preferably 10 to 23 emu/g in a magnetic field of 10 KOe.

Plate-like barium ferrite particles according to the present invention which has a desired particle size of an average particle diameter of not less than 0.03 $\mu$m and less than 0.1 $\mu$m are suitable as a precursor of a magnetic material for sintered magnets and magnetic recording media.

The present invention will now be explained with reference to the following examples and comparative examples.

The average particle diameter in each of the experiments, examples and comparative examples is represented by the value measured from an electron microphotograph.

The magnetization and the coercive force of the particles were measured in the powder form in magnetic field of 10 KOe.

EXAMPLE 1

An aqueous alkaline suspension of 14.0 mol of Fe(NO$_3$)$_3$, 1.2 mol (equivalent to 8.57 atom % with respect to Fe(III)) of Co(NO$_3$)$_2$, 0.2 mol (equivalent to Ti/Co=0.167 in a molar ratio) of TiCl$_4$, 1.40 mol of Ba(OH)$_2$.8H$_2$O and 164 mol of NaOH was charged into an autoclave, heated to 280° C. and held at this temperature for 5 hours while being mechanically stirred, thereby obtained brown ferromagnetic precipitates.

After the suspension was cooled to room temperature, the brown ferromagnetic precipitates were filtered out, washed adequately, and dried.

Figure 2:
FIGS. 2 and 3 are electron microphotographs (×100,000) of the particle structures of the plate-like barium ferrite particles produced from an aqueous solution in Example 1 and Comparative Example 1, respectively.

The brown ferromagnetic particles were identified as BaO.5.5[(Fe$_{0.909}$Co$_{0.078}$Ti$_{0.013}$)$_2$O$_{2.94}$] as a result of X-ray fluorescence analysis and X-ray diffraction. As is clear from the electron microphotograph ($\times$100,000) in FIG. 2, they were plate-like barium ferrite particles having an average particle diameter of 0.04 $\mu$m, a BET specific surface area of 90.7 m$^2$/g, and a magnetization of 10.5 emu/g.

The plate-like barium ferrite magnetic particles which were obtained by baking the brown ferromagnetic particles at 800° C. for 2 hours had an average particle diameter of 0.04 $\mu$m, a coercive force of 1097 Oe and a magnetization of 55.3 emu/g.

EXAMPLE 2

Brown ferromagnetic precipitates were obtained in the same manner as in Example 1 except that the amount of TiCl$_4$ to be added was 0.7 mol (equivalent to Ti/Co=0.583 in a molar ratio).

The brown ferromagnetic particles obtained were identified as BaO.5.7[(Fe$_{0.881}$Co$_{0.075}$Ti$_{0.044}$)$_2$O$_{2.97}$] as a result of X-ray fluorescence analysis and X-ray diffraction. According to an electron microphotograph, they were plate-like barium ferrite particles having an average particle diameter of 0.08 $\mu$m, a BET specific surface area of 66.2 m$^2$/g and a magnetization of 20.3 emu/g.

The plate-like barium ferrite magnetic particles which were obtained by baking the brown ferromagnetic particles at 820° C. for 1.5 hours had an average particle diameter of 0.08 $\mu$m, a coercive force of 882 Oe and a magnetization of 55.1 emu/g.

EXAMPLE 3

An aqueous alkaline suspension of 14 mol of FeCl$_3$, 0.6 mol (equivalent to 4.29 atom % with respect to Fe(III)) of CoCl$_2$, 0.3 mol (equivalent to Ti/Co=0.50 in a molar ratio) of TiCl$_4$, 1.56 mol of BaCl$_2$.2H$_2$O and 188 mol of NaOH was charged into an autoclave, heated to 200° C. and held at this temperature for 5 hours while being mechanically stirred, thereby obtaining brown ferromagnetic precipitates.

After the suspension was cooled to room temperature, the brown ferromagnetic precipitates were filtered out, washed adequately, and dried.

The brown ferromagnetic particles obtained were identified as $BaO.4.8[(Fe_{0.940}Co_{0.040}Ti_{0.020})_2O_{2.98}]$ as a result of X-ray fluorescence analysis and X-ray diffraction. According to an electron microphotograph, they were plate-like barium ferrite particles having an average particle diameter of 0.06 μm.

The plate-like barium ferrite magnetic particles which were obtained by baking the brown ferromagnetic particles at 850° C. for 2 hours had an average particle diameter of 0.06 μm, a coercive force of 1740 Oe and a magnetization of 53.7 emu/g.

EXAMPLE 4

An aqueous alkaline suspension of 14 mol of Fe(NO$_3$)$_3$, 1.54 mol (equivalent to 11 atom % with respect to Fe(III)) of Co(NO$_3$)$_3$, 0.8 mol (equivalent to Ti/Co=0.519 in a molar ratio) of TiCl$_4$, 1.47 mol of Ba(OH)$_2$.8H$_2$O and 168 mol of NaOH was charged into an autoclave, heated to 250° C. and held at this temperature for 5 hours while being mechanically stirred, thereby obtaining brown ferromagnetic precipitates.

After the suspension was cooled to room temperature, the brown ferromagnetic precipitates were filtered out, washed adequately, and dried.

The brown ferromagnetic particles obtained were identified as $BaO.5.5[(Fe_{0.857}Co_{0.094}Ti_{0.049})_2O_{2.96}]$ as a result of X-ray fluorescence analysis and X-ray diffraction. According to an electron microphotograph, they were plate-like barium ferrite particles having an average particle diameter of 0.09 μm.

The plate-like barium ferrite magnetic particles which were obtained by baking the brown ferromagnetic particles at 750° C. for 2 hours had an average particle diameter of 0.09 μm, a coercive force of 524 Oe and a magnetization of 51.9 emu/g.

COMPARATIVE EXAMPLE 1

Brown ferromagnetic precipitates were obtained in the same manner as in Example 1 except that the amount of TiCl$_4$ to be added was 1.2 mol (equivalent to Ti/Co=1 in a molar ratio).

Figure 3:
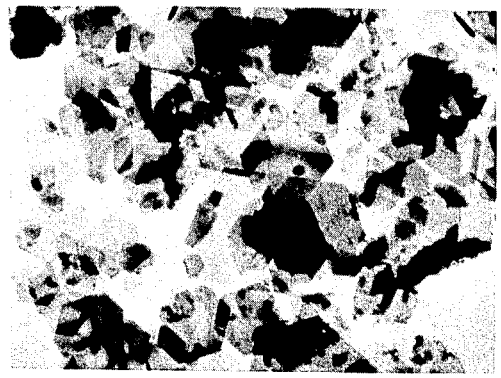

The brown ferromagnetic particles obtained were identified as $BaO.5.9[(Fe_{0.854}Co_{0.073}Ti_{0.073})_2O_{3.00}]$ as a result of X-ray fluorescence analysis and X-ray diffraction. As is clear from the electron microphotograph (×100,000) shown in FIG. 3, they were plate-like particles having an average particle diameter of 0.12 μm.

COMPARATIVE EXAMPLE 2

Brown ferromagnetic precipitates were obtained in the same manner as in Example 1 except that the amount of Co(NO$_3$)$_2$ was 0.2 mol (equivalent to 1.43 atom % with respect to Fe(III) and the amount of TiCl$_2$ to be added was 0.1 mol (equivalent of Ti/Co=0.5 in a molar ratio).

The brown ferromagnetic particles obtained were identified as $BaO.5.1[(Fe_{0.979}Co_{0.014}Ti_{0.007})_2O_{2.99}]$ as a result of X-ray fluorescence analysis and X-ray diffraction. According to an electron microphotograph, they were plate-like particles having an average particle diameter of 0.15 μm.

What is claimed is:

1. A process for producing plate-like barium ferrite particles, which are represented by the following formula (I):

$$BaO.n[(Fe_{1-x-y}Co_xTi_y)_2O_{3-x+y}] \qquad (I)$$

wherein x and y are independently from 0.02 to 0.12 and n is from 4 to 7, the atomic ratio of Co to Fe being from 0.02:1 to 0.13:1 and the molar ratio of Ti to Co being from more than 0 to not more than 0.8, which comprises autoclaving at a temperature of from 120° to 330° C. an aqueous alkaline suspension of Fe(III), Co(II), Ti(IV) and Ba ions and a molar excess with respect to the total amount of Fe (III), Co (II), Ti(IV) and Ba ions of an alkali metal hydroxide, in said suspension the atomic ratio of the amount of Co to the amount of Fe(III) being from 0.02:1 to 0.13:1 and the molar ratio of Ti to Co being from more than 0 to not more than 0.8, to effect formation of said plate-like barium ferrite particles having an average diameter of from not less than 0.03 μm to less than 0.1 μm.

* * * * *